No. 742,726.

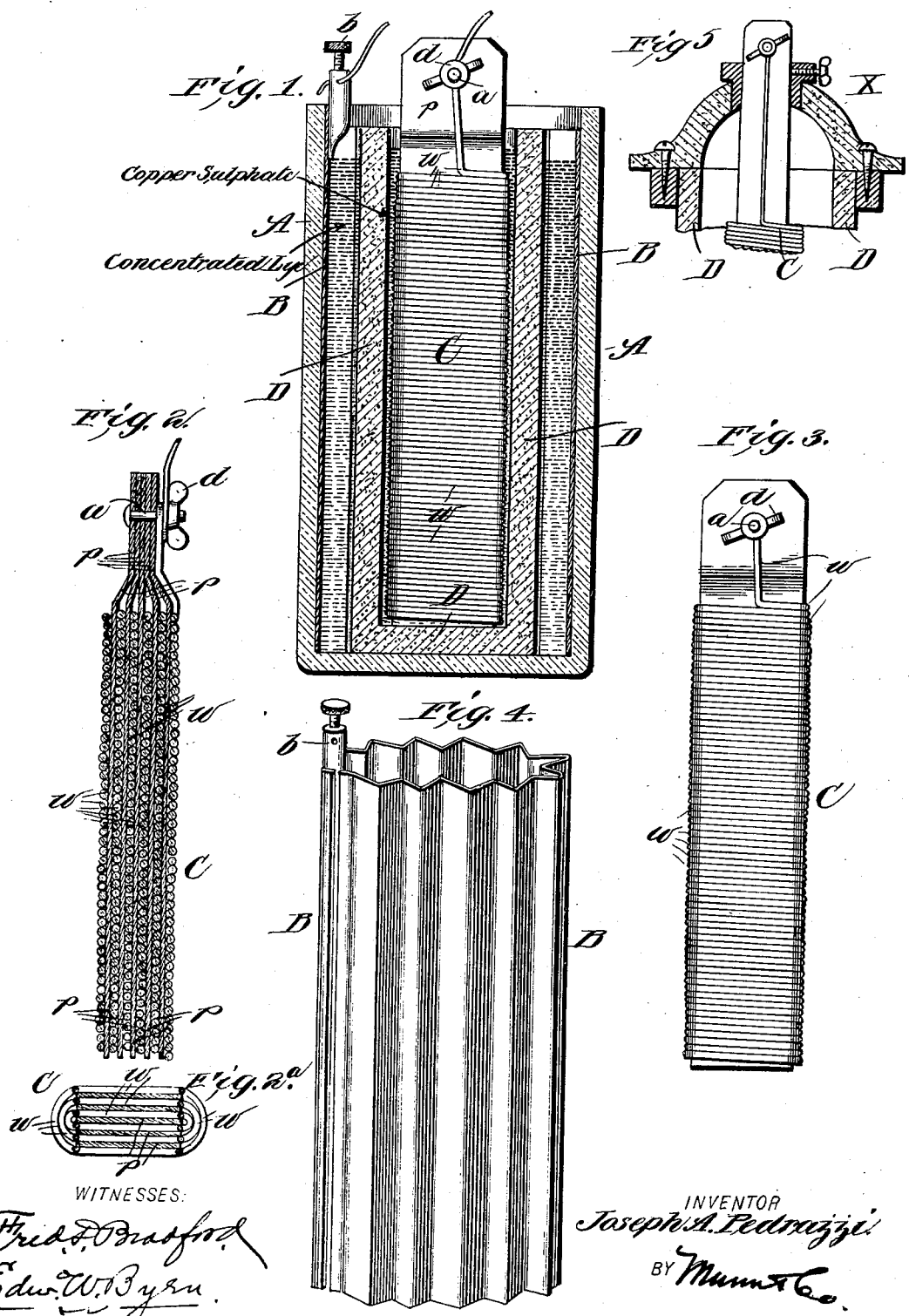

Patented October 27, 1903.

UNITED STATES PATENT OFFICE.

JOSEPH ANTHONY PEDRAZZI, OF CARMEL, CALIFORNIA.

PRIMARY BATTERY.

SPECIFICATION forming part of Letters Patent No. 742,726, dated October 27, 1903.

Application filed July 16, 1903. Serial No. 165,728. (No model.)

*To all whom it may concern:*

Be it known that I, JOSEPH ANTHONY PEDRAZZI, of Carmel, in the county of Monterey and State of California, have invented a new and useful Improvement in Primary Batteries, of which the following is a specification.

My invention is in the nature of a new primary battery designed for both closed and open circuit work and applicable for all the uses for which a voltaic or galvanic battery is ordinarily employed.

It consists in the novel construction and arrangement of parts, which I will now proceed to describe with reference to the drawings, in which—

Figure 1 is a vertical central section through one of my battery-cells. Figs. 2 and 2$^a$ are respectively a longitudinal and transverse section of the copper electrode. Fig. 3 is a side view of the same. Fig. 4 is a perspective view of the zinc electrode, and Fig. 5 is a modification showing a cover for the top of the battery.

In the drawings, A represents the glass jar or outer casing of the cell.

B is the zinc electrode; C, the copper electrode, and D is the porous cup.

The zinc electrode B is made in sheet form bent around into a nearly-cylindrical shell and corrugated with vertical flutes and provided with a binding-post $b$, as seen in Fig. 4. It is made in this shape to give greater surface and to hold the porous cup concentrically against jostling about.

The porous cup is of any ordinary mineral composition and is seated inside the zinc cylinder.

The copper electrode C is of a special built-up construction, as shown in Figs. 2, 2$^a$, and 3. It is formed of any desired number of parallel copper plates $p\ p\ p$, with alternating layers of bare copper wire $w\ w\ w$ wrapped transversely around the copper plates and binding them all together. At the upper end the plates are bent inwardly and brought to a flat bearing against each other, as shown in Fig. 2, and are clamped by a screw-stem $a$ and a thumb-nut $d$, the end of the wire $w$ being also secured under the thumb-nut, which also serves as a binding-screw for the circuit-wire. In building up this element of the battery a single flat copper plate is first taken and is wrapped transversely with a helix of copper wire. Two other flat plates are then laid parallel to the first plate and one on each side of the wire wrapping thereon. The wire is now continued with its wrappings, so as to inclose these two additional plates and hold them in place. As many more of the plates and alternate windings of wire are added as may be desired.

The exciting fluids used are concentrated lye for the zinc electrode and sulfate of copper for the copper electrode. The copper solution is charged with an extra supply of crystals of sulfate of copper, and the lye solution may also have more lye crystals added than can be dissolved; but this will only be done where the battery is to work without renewal.

The advantages of my form of built-up copper electrode are its great surface, its compactness and large power for a given size, its freedom from bubbles and polarizing, and its strong and steady current.

The current of this cell may be raised or lowered in strength, as desired, by adding more copper wire or taking some off, and it may also be conveniently regulated by raising or lowering the electrode in the liquid.

This battery may be used in every situation where a battery is required, such as for electroplating, telegraphy, telephones, fire-alarms, burglar-alarms, toys, bells, electric motors, for thereapeutic and surgical uses, or for electric lights in places isolated from the wires of a power plant.

In some cases, especially when used as a dry battery, the cell is to be closed at the top and sealed with rosin or paraffin, which will prevent evaporations and spilling. For some uses also, as for electroplating, the battery-cell may have a detachable cover, as seen at X in Fig. 5.

Having thus described my invention, what I claim as new, and desire to secure by Letters Patent, is—

1. A galvanic battery comprising an outer casing and an inner porous cup, a solution of concentrated lye arranged between the porous cup and outer casing, a vertically-corrugated shell of zinc arranged within the concentrated lye, a solution of sulfate of copper in the porous cup and a copper element consisting of parallel plates of copper and alternating layers of copper wire wound about and binding the copper plates together substantially as and for the purpose described.

2. A copper element for a galvanic battery composed of parallel copper plates with alternating layers of copper wire wound transversely and binding the plates together substantially as and for the purpose described.

3. A copper element for a galvanic battery composed of parallel copper plates spaced apart at their lower ends and in flat contact with each other at their upper ends, transverse windings of copper wire arranged in alternating layers between the plates and binding the plates together, and a clamp-screw connecting the upper ends of the plates together substantially as and for the purpose described.

JOSEPH ANTHONY PEDRAZZI.

Witnesses:
 JOHN BERTA,
 LORENZO MARTELLA,
 JOHN K. ALEXANDER.